US011524342B2

United States Patent
Ammersdörfer et al.

(10) Patent No.: US 11,524,342 B2
(45) Date of Patent: Dec. 13, 2022

(54) TOOL HOLDER (71) Applicant: ALBRECHT PRÄZISION GMBH & CO. KG

(72) Inventors: Joel Ammersdörfer, Lorch (DE); Martin Schmideder, Leinfelden-Echterdingen (DE); Kristina Kovac, Wernau (DE)

(73) Assignee: ALBRECHT PRÄZISION GMBH & CO. KG, Wernau (DE)

( * ) Notice: Subject to any disclaimer, the term of this patent is extended or adjusted under 35 U.S.C. 154(b) by 79 days.

(21) Appl. No.: 17/053,314

(22) PCT Filed: May 8, 2019

(86) PCT No.: PCT/EP2019/061764
§ 371 (c)(1),
(2) Date: Nov. 5, 2020

(87) PCT Pub. No.: WO2019/215204
PCT Pub. Date: Nov. 14, 2019

(65) Prior Publication Data
US 2021/0229187 A1 Jul. 29, 2021

(30) Foreign Application Priority Data

May 8, 2018 (DE) ...................... 10 2018 111 044.8

(51) Int. Cl.
*B23B 31/20* (2006.01)
(52) U.S. Cl.
CPC .... *B23B 31/201* (2013.01); *B23B 2231/2008* (2013.01)
(58) Field of Classification Search
CPC ............ B23B 31/201; B23B 31/20125; B23B 31/208; B23B 2231/2008; B23B 2231/04;
(Continued)

(56) References Cited

U.S. PATENT DOCUMENTS 1,370,598 A * 3/1921 Lapointe ............... B23B 31/201
279/147
3,030,119 A * 4/1962 Myers ................... B23B 31/201
279/53
(Continued)

FOREIGN PATENT DOCUMENTS

CN 105665764 A 6/2016
DE 3600466 A1 7/1987
(Continued)

OTHER PUBLICATIONS

Machine Translation, FR912165A. (Year: 1946).*
(Continued)

*Primary Examiner* — Chwen-Wei Su
(74) *Attorney, Agent, or Firm* — Cantor Colburn LLP (57) ABSTRACT

A tool holder for collet chucks, wherein a clamping rotor for applying an axial force to a collet chuck is provided. The clamping rotor, including the two axial bearings of the clamping rotor, are accommodated in a tool holder main part, which is connected to a collet chuck receiving body that receives the collet chuck. In order to captively support the clamping rotor in the main part, a bearing seat element is screwed into the main part, said bearing seat element delimiting a receiving chamber for the clamping rotor towards the collet chuck receiving element. Thus, the clamping rotor is enclosed and held in the main part independently of the collet chuck receiving body. This creates new possibilities for the maintenance and adaptation of the tool holder under different conditions, and in particular the force flow emanating from the clamping rotor during a clamping process is kept away from the collet chuck receiving body, thereby improving the precision of the tool holder.

19 Claims, 4 Drawing Sheets

(58) Field of Classification Search
CPC .............. B23B 51/12; B23B 2260/008; Y10T 279/17538; Y10T 279/17547; Y10T 279/17529; Y10T 279/17341; Y10T 279/17333; Y10T 279/3406
See application file for complete search history.

(56) References Cited

U.S. PATENT DOCUMENTS

| | | | |
|---|---|---|---|
| 4,761,101 A | 8/1988 | Zettl | |
| 5,340,127 A * | 8/1994 | Martin | B23Q 1/0036 279/157 |
| 5,855,377 A * | 1/1999 | Murphy | B23B 31/201 279/50 |
| 6,270,086 B1 | 8/2001 | Llyod | |
| 6,572,119 B2 | 6/2003 | Selb | |
| 2010/0148455 A1* | 6/2010 | Taguchi | B23B 31/201 279/48 |

FOREIGN PATENT DOCUMENTS

| | | |
|---|---|---|
| DE | 10056729 A1 | 5/2002 |
| EP | 0304558 A2 | 3/1989 |
| EP | 0305558 A1 | 3/1989 |
| EP | 1206990 A1 | 5/2002 |
| FR | 912165 A * | 8/1946 |

OTHER PUBLICATIONS

Machine Translation, CN105665764A. (Year: 2016).*
English Translation for International Search Report for International Application No. PCT/EP2019/061764.
International Search Report for International Application No. PCT/EP2019/061764.
Written Opinion for International Application No. PCT/EP2019/061764.
German Office Action for German Application No. 102018111044.8 dated Apr. 8, 2022; 7 pages.

* cited by examiner

TOOL HOLDER

CROSS REFERENCE TO RELATED APPLICATIONS

This application is a National Stage of PCT Application No. PCT/EP2019/061764 filed on May 8, 2019, which claims priority to German Patent Application No. 10 2018 111 044.8 filed on May 8, 2018, the contents each of which are incorporated herein by reference thereto.

TECHNICAL FIELD

The invention refers to a tool holder for mounting of tools, particularly tools for chip creating workpiece machining with a rotating tool.

BACKGROUND

Tools, as particularly drills, milling tools or the like, are typically received in a tool holder and thereby fixedly clamped in a torque-proof manner as well as axially, wherein the tool holder is provided with an interface that serves for the connection with a machine spindle. Such tool holders are, for example, equipped with tools that are provided in a so-called tool magazine and that are exchanged in and out of the working spindle of a machine by means of the tool exchange device.

Such a tool holder is known, e.g. from EP 1 206 990 A1. This tool holder comprises a tapered shank on the machine side. It is provided with a reception for a collet chuck on the tool side. The tool holder is separated into a basic body and a collet chuck reception body that comprises a cone-shaped seat for a collet chuck. The base body is provided with a through-hole in which a clamping rotor is provided having a clamping thread for the clamping chuck. The rotor is radially as well as axially supported at its axial side located distant from the clamping chuck reception body in and on the base body by means of a first roller bearing. At the side next to the collet chuck reception body a second roller bearing is provided that is supported radially at the collet chuck reception body and radially at the tube extension of the base body. On this tube extension the collet chuck reception body is threaded with the base body. In a short configuration according to EP 1 206 990 A1, it is provided that the clamping rotor comprises a wide opening in which the collet chuck can extend. This leads to a thin-walled filigree configuration of the clamping rotor. In addition, an exchange of the collet chuck reception body is not provided and also not possible.

The axial clamping chuck discussed so far comprises a relatively large outer diameter.

From EP 0305558 A2 a tool holder having a similar configuration is known in which, however, the clamping rotor is reduced to a ring provided with a toothing on the outside and with a thread on the inside. It is held between two axial thrust bearings adjoining the planar sides of this toothed ring, the axial thrust bearings being arranged in the base body of the tool holder. Also here, however, an exchange of the part of the base body serving for reception of the collet chuck is not provided.

BRIEF SUMMARY

It is the object of the invention to provide a concept for creation of a thin tool holder that is easy to manufacture and to service.

A tool holder for clamping of tools for chip removing machining of a workpiece with a rotating tool, a base body provided with a machine spindle interface, a tube extension and a central through-hole, the machine spindle interface at one end of the base body, and the tube extension at an end of the base body that is positioned away from the machine spindle interface, a clamping rotor that is arranged in the central through-hole, the clamping rotor being rotatably supported about an axial direction and connected with a rotation device in order to be rotated back and forth and locked in rotation positions, the clamping rotor including a clamping thread that a clamping pin of a collet chuck can be screwed, a support seat element inserted into the base body in an axially secured manner and a bearing supported on the support seat element, the bearing axially supporting the clamping rotor, and a collet chuck reception body that is attached to the tube extension, the collet chuck having a collet chuck reception opening.

The inventive tool holder comprises a base body that is provided with a machine spindle interface at one end and that comprises a tube extension at its other end distant from the machine spindle interface. The base body limits a central through-hole in which a clamping rotor is provided that is rotatably supported about an axial direction. The clamping rotor is connected with a rotation device in order to be specifically rotated clockwise and counter-clockwise and if necessary to be kept in rotational positions. The clamping rotor comprises an opening having a clamping thread that can be brought in engagement with a collet chuck.

A support seat element assigned to the clamping rotor is inserted in the base body in an axially secured manner and on which a bearing for the axial support of the clamping rotor is supported. The bearing is preferably an axial thrust bearing configured as plain bearing. The support seat element is preferably arranged in the tube extension and configured as ring carrying an outer thread. The through-hole width of this ring, i.e. its inner clear span, is at least on its side facing the support seat element preferably larger than the inner span of the collet chuck reception body. Thus, a collet chuck can extend through the collet chuck reception body into the support seat element, which leads to a short configuration of the tool holder.

In addition, the clamping rotor is captively held in the base body by the support seat element. Even if the collet chuck reception body is released from the base body, e.g. for repair purposes, service purposes or in order to carry out an adaption to other collet chucks, no parts that are part of the bearing or rotation device can fall out of the base body or can be lost. The handling and service of the inventive tool holder is thus particularly easy and safe.

Due to the inventive arrangement, in addition a thin configuration of the tool holder is created in which the outer diameter of the base body adjoining the collet chuck reception body is not larger than the outer diameter of the collet chuck reception body. The arrangement of the clamping rotor in axial distance to the conical area of a collet chuck to be inserted, i.e. in the range of its clamping pin, allows making the outer diameter of the clamping rotor at most as large and preferably smaller than the outer diameter of the clamping chuck itself on its end of its truncated cone-shaped section facing away from the tool. Similarly a toothed wheel forming part of the rotation device formed coaxially on the clamping rotor can have a root diameter that is not or not remarkably larger than the outer diameter of the collet chuck at its end facing the tool or facing away from the tool. Thus, a gear element being in engagement with the toothed wheel, such as a worm, can be placed near the rotation axis of the clamping rotor, which in turn leads to a small outer diameter of the tool holder in the area of the rotation device.

The tool holder comprises a machine interface on its machine side that is preferably configured as hollow shank taper or also in another manner. The hollow shank taper creates a particularly rigid connection of the tool holder with the working spindle of the machine tool. In this context the support of the clamping rotor on the base body by means of the support seat element is particularly advantageous. This arrangement leads to an increased inner oscillation damping of the tool holder compared with a direct support of the clamping rotor at the base body, which can be used to achieve an improved working result. The thread between the base body and the support seat element has a damping effect. It is particularly possible to support this damping by a suitable material selection for the support seat element.

Preferred embodiments of the inventive tool holder are subject of the drawings, the description and the dependent claims.

For example the tube extension for connection with the collet chuck reception body can be provided with any suitable connection structure including a friction-fit, a force-fit or a form-fit structure. Preferably the tube extension is provided with an outer thread that matches with an inner thread provided in the collet chuck reception body, such that also the tube extension is threaded with the collet chuck reception body. Thus, the collet chuck reception body can be separated from the base body, if necessary, and can be exchanged with another collet chuck reception body for example. This can happen for service purposes or for adaption purposes.

It is further advantageous, if the support seat element is arranged in the tube extension. In doing so, the support seat for the bearing can be arranged substantially in one plane in which the collet chuck reception body adjoins the base body. This leads to a compact and axially short configuration. In addition, this configuration leads to a tool holder with high internal oscillation damping that results particularly from the cooperation of the different formed adjoining surfaces formed by the outer thread and the inner thread of the tube extension.

In a preferred embodiment the thread by which the support seat element is held in the tube extension and the clamping thread by which the collet chuck is in engagement with the clamping rotor are configured having opposite directions of rotation. If one thread is a right-handed thread, the other thread is a left-handed thread and vice versa. Due to this measure, it is achieved that the support seat element is not released during clamping of a tool, but is subject to a torque in a rotation direction in which it is tightened against the base body. If for example the support seat element has a left-handed thread at the outside and the clamping rotor has a right-handed thread at the inside, a rotation to the right (counter clockwise rotation) leads to a tightening of the collet chuck. Thereby the clamping rotor is supported via the bearing on the support seat element. As a result of the bearing friction, the bearing seat element is thereby subject to a torque that acts in the same direction of rotation (counter clockwise). This torque acts on the support seat element in a tightening manner, such that an unintentional release thereof is avoided.

If the clamping rotor shall, however, be rotated in counter direction, i.e. in release direction, it is supported on the base body on its back bearing facing away from the clamping sleeve and thus does not introduce any torque in the support seat element.

Preferably the axial bearing supported by the support seat element is a plain bearing, whereas the axial thrust bearing facing the base body is preferably a roller bearing. The plain bearing that is effective in tightening direction has a friction that acts in a torque-limiting manner, whereas the roller bearing operates with low friction. As a result the clamping torques that can be created are lower than the releasing torques that can be created, which avoids a too tight clamping of tools and allows an easy release thereof.

Preferably the clamping rotor is supported in a floating manner in radial direction. It can be held in a centered, but flexible manner by spring elements, e.g. rubber rings, rubber seals, such as e.g. O-rings or the like. In doing so, the clamping rotor can be centered as pre-defined by the collet chuck and does not create any remarkable radial forces thereon. This complies with the clamping accuracy.

In addition, the radially floating support can be used to limit the clamping torque. If a toothing formed at the clamping rotor and being in engagement with a worm that is orientated transverse to the clamping rotor, is used as rotation device, a radial force component is created due to the tooth engagement between the worm and the toothing of the clamping rotor during tightening thereof by means of which the outer circumferential surface of the clamping rotor abuts at corresponding surfaces of the central through-hole of the support seat element and/or the base body. The friction created there limits the clamping torque in addition to the breaking torque provided by the axial thrust bearing.

The tool holder can comprise a releasable ring at its end facing away from the machine spindle interface that is, for example, placed on the collet chuck reception body. This releasable ring can be part of a set of different rings that are part of the tool holder. The rings can distinguish from each other by rigidity, damping characteristics or other features such that the tool holder can be adapted to different machining situations. In addition, the ring can contain channels, e.g. for cooling lubricant or the like, that end at ejection openings provided on the face side. The rings of one set can distinguish from each other by the number and orientation of the ejection openings. Additional variations are possible.

BRIEF DESCRIPTION OF THE DRAWINGS

Embodiments and preferred details of embodiments of the invention can be derived from the drawings, the description or the claims. The drawings show:

DETAILED DESCRIPTION

Figure 1:
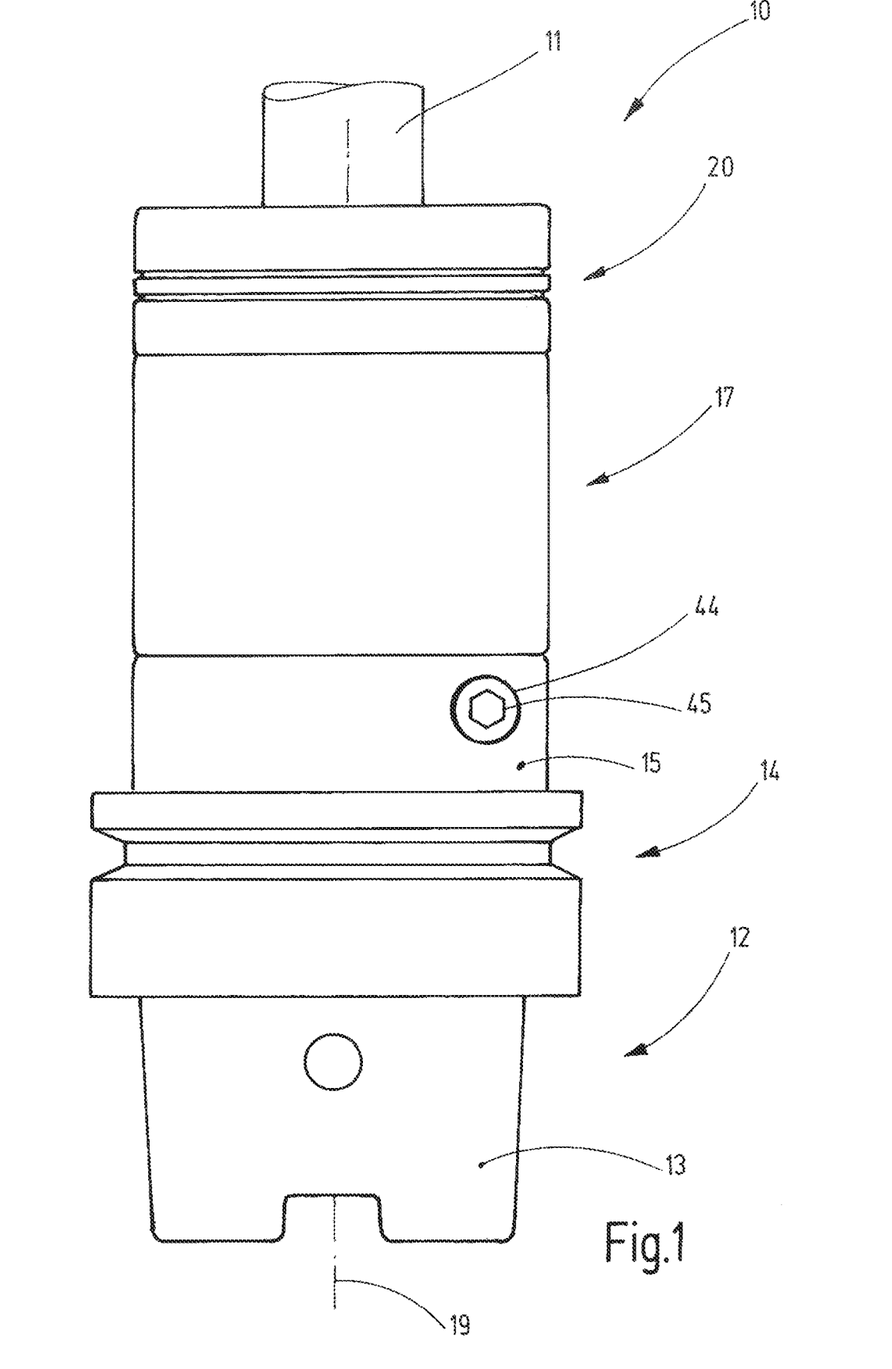
FIG. 1 an inventive tool holder in a schematic side view.

FIG. 1 illustrates a tool holder 10 that is configured for reception of a tool 11 that is apparent in FIG. 1 only schematically by its shank. The tool 11 is held in the tool holder 10 in an axially non-shiftable and thereby torque-proof manner. At its end opposite the tool 11 the tool holder 10 comprises a machine spindle interface 12 that is, for example, configured as hollow shank taper 13. With this machine spindle interface 12 the tool holder 10 can be connected with a standardized tool holder chuck of a machine spindle, i.e. a rotatably driven working spindle of a machine tool. Not further illustrated tool changing devices serve for exchanging the tool holder 10 in and out of such a working spindle. A so-called gripping disc 14 defined on the tool holder 10 serves the tool holder for being coupled and temporarily received in order to transport the tool holder 10 between a tool magazine and the working spindle to and fro as well as to insert it in the working spindle and remove it therefrom.

Figure 2:
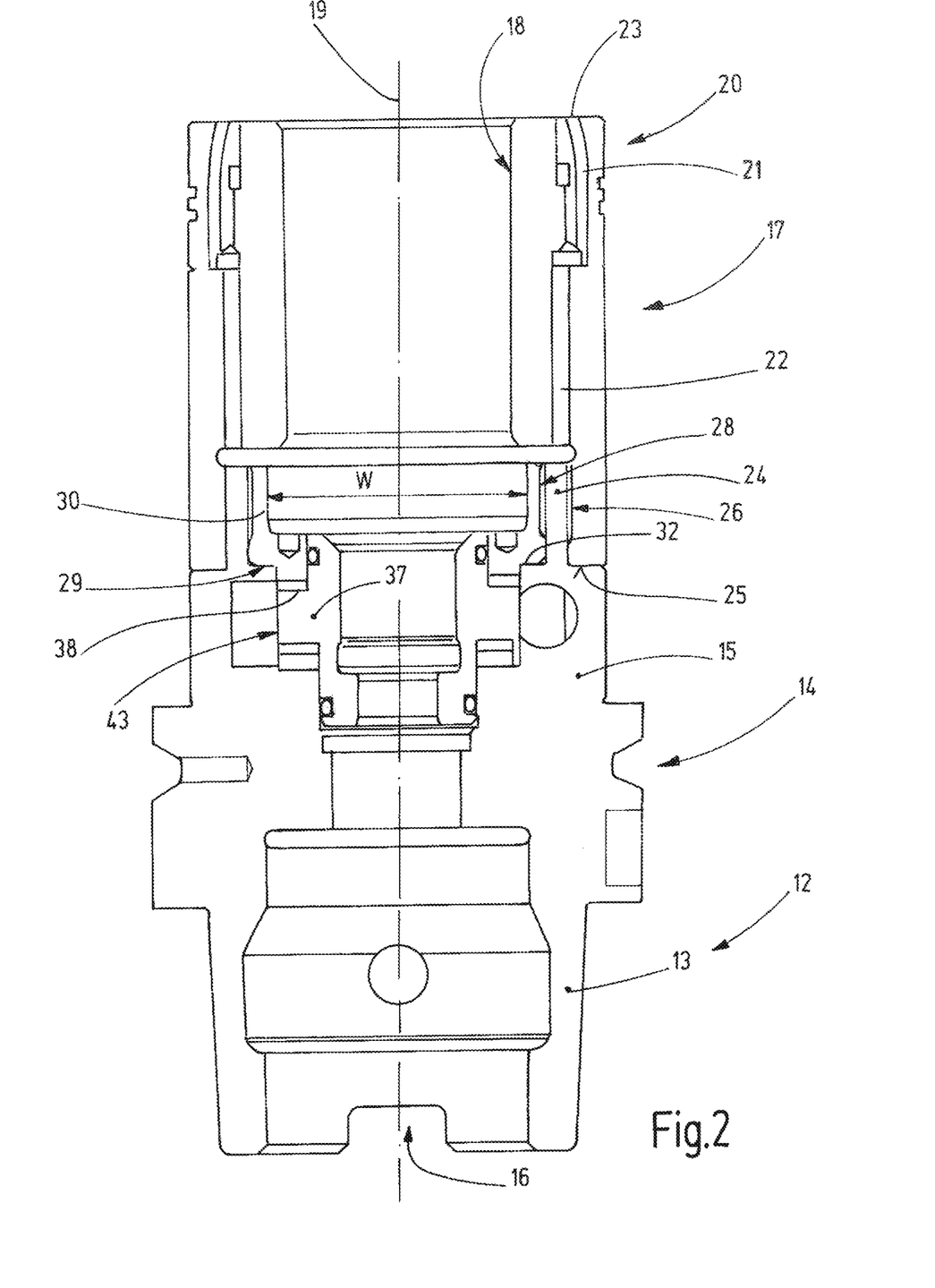
FIG. 2 the tool holder according to figure one without collet chuck in a schematic longitudinal sectional illustration, FIG. 3 the tool holder according to FIGS. 1 and 2 in a longitudinal sectional illustration with collet chuck, FIG. 4 the support and the rotation device of the inventive tool holder in a partly and enlarged sectional illustration.

The machine spindle interface 12 and the gripper disc 14 are preferably part of a base body 15 that comprises a central through-hole 16, as apparent from FIG. 2. This leads in a collet chuck reception body 17 that axially adjoins the base body 15 and that comprises a truncated cone-shaped collet chuck reception opening 18. This is arranged concentrically with regard to a central axis 19 that is concurrently rotation and central axis of the tool 11, as well as the not further illustrated working spindle.

Outside on its tool side end the collet chuck reception body 17 in addition carries a preferably exchangeably configured ring 20 that can be made from the same or a different material as the collet chuck reception body 17 and that can comprise ejection channels 21. They communicate preferably with fluid channels 22 that extend through the collet chuck reception body 17 and/or the base body 15 and that serve to supply cooling fluid, lubricating fluid or the like to ejection openings 23 provided at the ring 20. The ring 20 can be part of a set of not further illustrated other rings that can consist of a different material or that can have a different geometric configuration, such that they comprise a different radial rigidity, different oscillation damping characteristics or different numbers and/or orientations of the ejection openings 23.

The base body 15 comprises a substantially rotatingly symmetric basic shape. In addition to the machine spindle interface arranged concentrically to the central axis 19 and the gripper disc 14, also concentrically arranged to the central axis 19, a tube extension 24 is part of the base body 15 that is arranged concentrically to the central axis 19 at the side opposite the machine spindle interface 12. The tube extension 24 comprises a smaller diameter than the outer diameter of the collet chuck reception body. At its base body side end it adjoins a planar surface 25 of the base body against which the collet chuck reception body firmly abuts with its face facing the base body 15.

The tube extension 24 is provided with an outer thread 26 with which the collet chuck reception body 17, that comprises a respective inner thread, is firmly threaded. The thread can be additionally glued in order to avoid an unintentional release of the collet chuck reception body 17 from the base body 15. It is, however, also possible to keep the thread releasable in order to be able to exchange the collet chuck reception body 17, if needed, e.g. for service purposes, repair purposes or adaption purposes.

In connection therewith it is possible to provide a set of different collet chuck reception bodies 17 that distinguish from each other by at least one characteristic. For example the different collet chuck reception bodies can have different outer diameters and/or different collet chuck reception openings and/or different axial lengths.

The tube extension 24 is in addition provided with an inner thread 28. A ring shoulder 29 adjoins the tube extension 24 at the inner side, wherein the ring shoulder 29 is preferably formed by an abutment surface configured in a planar manner and against which a support seat element 30 is tightened that is screwed in the tube extension 24 and provided with an outer thread. The support seat element 30 is a ring that is concentrically arranged to the central axis 19 carrying an outer thread, wherein the ring comprises an inner opening width W adjoining the collet chuck reception body that is larger than the diameter of a collet chuck 31 extending in the support seat element 30, as can be taken from FIG. 3.

The support seat element 30 comprises at its side facing the base body 15 a planar abutment surface 32 that is pressed against the ring shoulder 29, if the support seat element 30 is firmly tightened seated in the base body 15.

At its end facing the base body 15 the support seat element 30 comprises a face 33 (compare particularly FIG. 4) that serves as support seat for an axial thrust bearing. The axial thrust bearing is formed, for example, by a slide ring 34 that can be configured as flat ring having two planar flat sides 35, 36 that are parallel to each other. The axial thrust bearing formed by the slide ring 34 serves for an axial support of the clamping rotor 37 that is supported with a preferably planar ring-shaped support surface on the planar surface 36 of the slide ring 34 and thus on the support seat element 30. The force flow of the clamping force with which the collet chuck is tightened is guided via the support seat element 30. The support seat element 30 can consist of the same material as the base body 15 or of a different material. By coordination of the material characteristics with each other, an oscillation damping effect can be achieved.

The support seat element 30 comprises at the outer side a cylindrical or slightly conical mating surface 39 adjoining the face 33, wherein the mating surface 39 abuts at a respective wall of the base body 15, whereby the support seat element 30 is positioned radially centrically aligned to the central axis 19. A wall surface 40 that is preferably cylindrically configured adjoins the face 33 at the radially inner side. This wall surface 40 limits a through-hole in which a cylindrical extension 41 of the clamping rotor 37 extends. One or more grooves can be provided in the extension 41 for reception of an 0-ring 42 or another seal or another spring element preferably consisting of an elastomer. The ring 42 holds the clamping rotor 37 in a centrically aligned condition, if no collet chuck 31 is present. It also seals the gap between the extension 41 and the wall surface 40 and provides a breaking torque for the clamping rotor 37. The clamping rotor 37 comprises a toothing 43 adjoining the support surface 38 at its outer circumference, wherein the toothing 43 is in engagement with a worm 44. The worm 44 is rotatingly supported about a rotation axis that is orientated transverse to the central axis 19 and, as illustrated in FIG. 1, is accessible from outside. It can be rotated by means of a tool. For engagement of the tool, the worm 44 can be provided with a polygonal blind hole, e.g. hexagon opening 45 or another tool engagement profile.

By rotating the worm 44, the clamping rotor 37 is rotated with a respective gear reduction. The toothing 43 and the worm 44 thus form a rotation device 46 for the clamping rotor 37.

Figure 4:
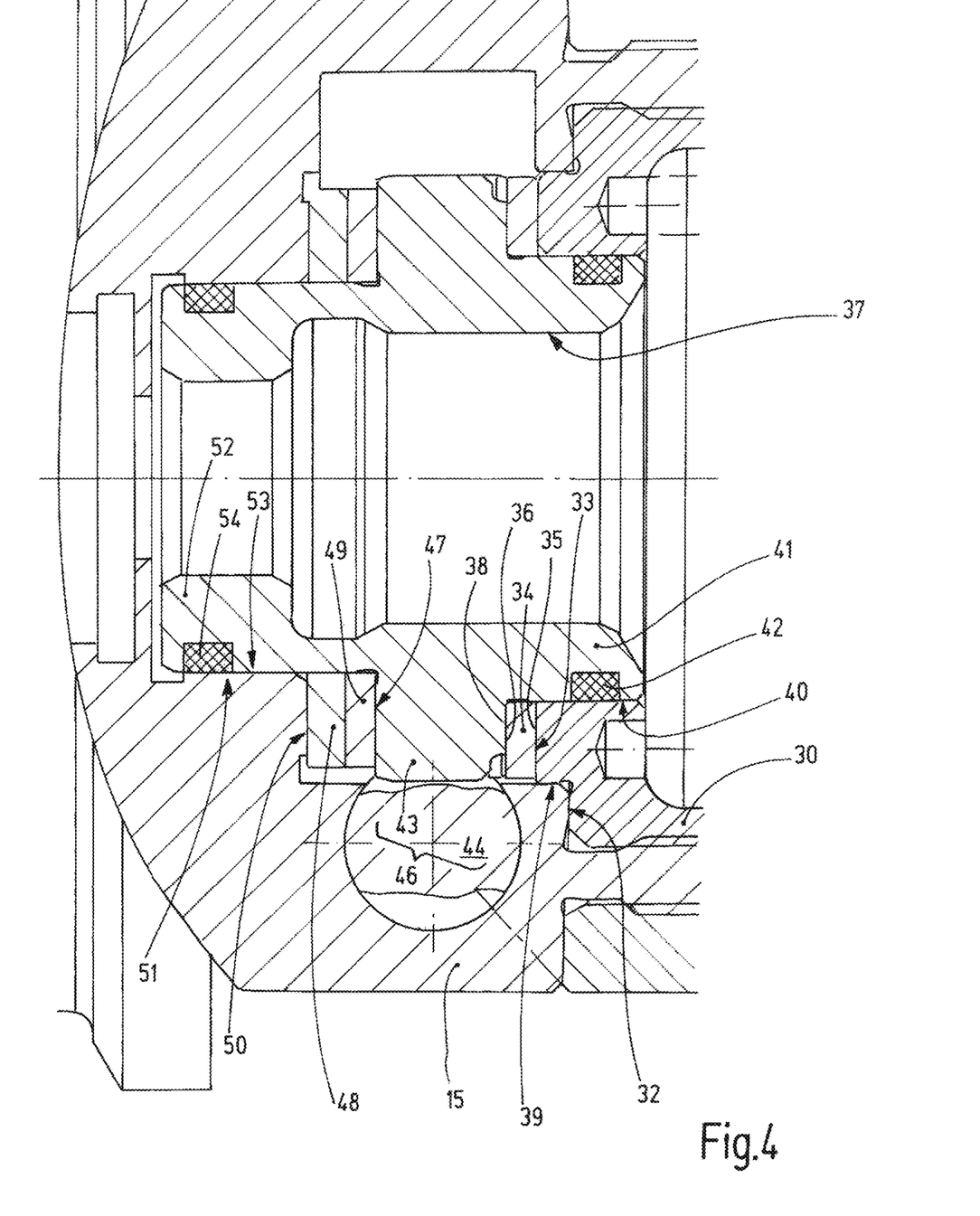

A further support surface 47 adjoins the toothing 43 as particularly apparent from FIG. 4 that is preferably configured as planar surface. The support surface is in abutment with a support ring 49 that is supported on a shoulder 50 of the base body 15 via roller bodies 48, e.g. in the form of balls arranged in one or more rows, thin rollers, cones or needles. The ring shoulder 50 in turn adjoins a for example cylindrical section 51 of the through channel of the base body 15 into which an extension 52 of the clamping rotor extends. The extension 52 can have a cylindrical outer surface 51 in which one or more grooves for reception of O-rings 54 are provided. Instead of O-rings 54 that seal the gap between the section 51 and the outer surface 53, also other sealing elements or spring elements, particularly made of elastomer, can be provided. The O-rings 42, 54 hold the clamping rotor 37 flexibly (floatingly) centered with regard to the central axis 19.

Figure 3:
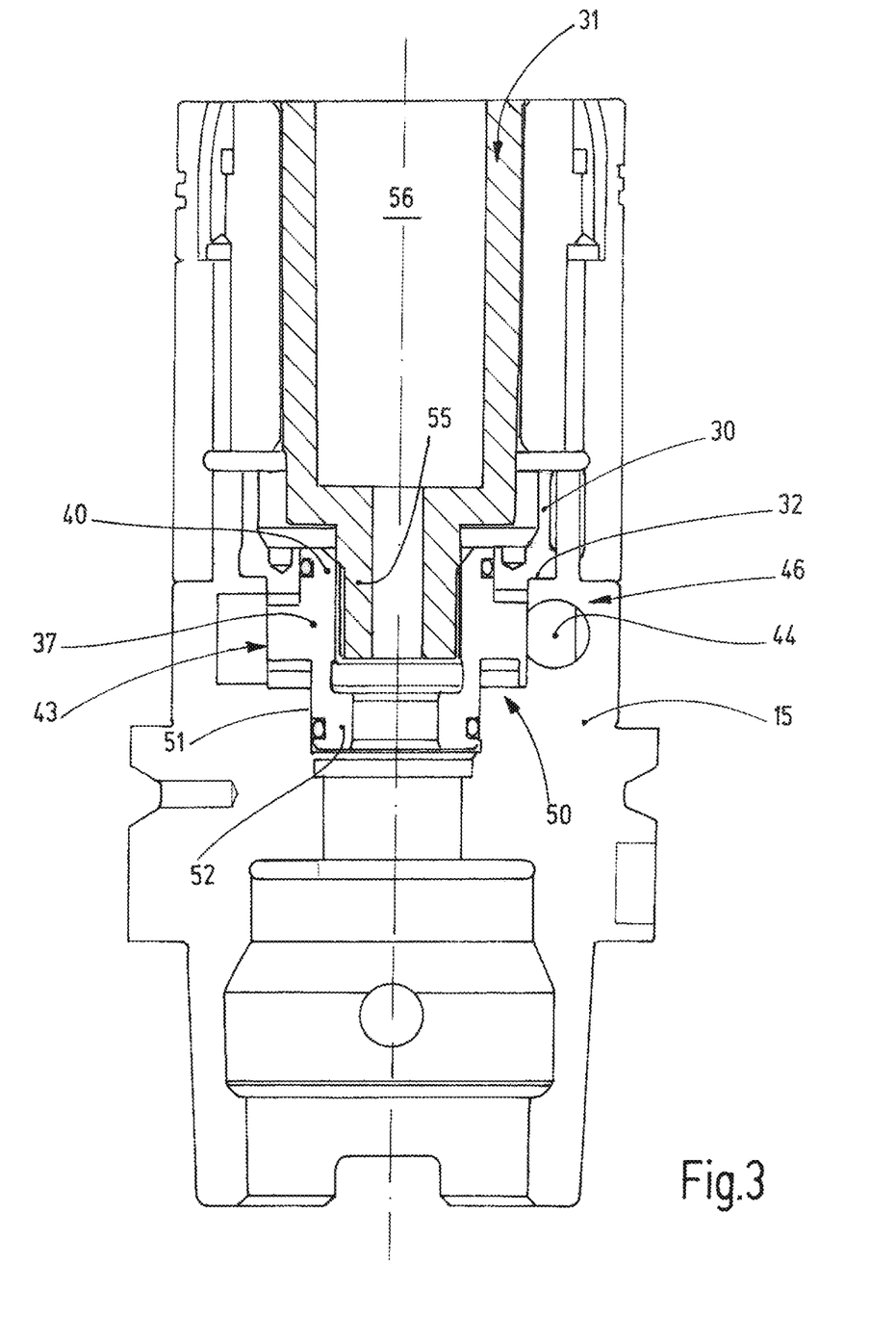

The clamping rotor 37 is provided with a thread on the inner side, as can be taken from FIG. 3, that is an engagement with an outer thread of a clamping pin 55 of the collet chuck 31. The thread provided at the clamping pin 55 and the clamping rotor 37 have preferably an opposite rotating direction compared with the inner thread of the extension 24. For example, the inner thread 28 can be a left-handed thread, whereas the thread of clamping pin 55 is a right-handed thread.

The clamping pin 55 has a diameter that is smaller than the diameter of the collet chuck 31 measured at the end of its conical section. The conical section can extend in the support seat element 30.

The tool holder described so far is used for clamping and releasing of round shanks of tools as follows:

For clamping a tool shank is moved in the cylindrical reception opening 56 up to a desired depth, e.g. completely. Not further illustrated means can be provided at the collet chuck 31 in order to lock the shank of the tool axially firmly in the collet chuck 31. For example, radial or transverse pins can serve for this purpose that cooperate with respective cavities of the tool shank and that are held in the collet chuck. In addition, a spring, a screw or the like can be arranged in the clamping pin 55 of the collet chuck 31 that clamps the tool with a force that is orientated axially outward against the respective locking means or that serves as depth stop in order to impede a push-in of the tool shank in the collet chuck 31.

The insertion of the tool in the collet chuck 31 can be carried out inside the tool holder 10. It is, however, also possible to bring the tool 11 and the collet chuck 31 in engagement with each other outside the tool holder 10, if axial locking means are provided to mount or activate them.

For the actual clamping of the tool in the tool holder 10 the thread of clamping pin 55 is in engagement with the inner thread of the clamping rotor 37. The latter is rotated by means of the rotation device 46 such that the collet chuck 31 is pulled into the collet chuck reception opening 18. Thereby the clamping rotor 37 is supported via a slide ring, i.e. via the axial thrust bearing configured as plain bearing, on the support seat element 30. The axial thrust bearing thereby limits the clamping torque that can be applied as a result of its sliding friction. In addition, another torque limitation can be achieved in that the worm 44 applies a radial force on the clamping rotor 37 due to the inclined position of its tooth flanks, whereby the parts of the extensions 41, 52 opposite the worm 44 get in contact with the respective wall surfaces 40, 51 that further inhibits the rotation of the clamping rotor 37.

If the tool 11 is tightened in this manner, the tool holder with the tool 11 is ready for use.

For releasing the tool 11 the worm 44 is rotated in counter direction. It is now supported via the roller bearing formed by the roller bodies 48 on the base body 15 and presses the collet chuck 31 in direction out of the collet chuck reception opening 18. The collet chuck 31 and thus the tool 11 are thus released.

In all embodiments described above a roller bearing can be provided instead of the slide ring 34 that forms a friction bearing. An over-tightening of collet chuck 31 can also be achieved by friction of the clamping rotor at its circumferential surface, as described above. In addition, it is possible to limit a tightening torque, e.g. by providing a torque-limiting tool for rotation of the worm 44.

In an inventive tool holder 10 for collet chucks 31 a clamping rotor 37 for application of an axial force on a collet chuck 31 is provided according to the invention, wherein this clamping rotor including its two axial bearings is accommodated in a base body of the tool holder 10 with which a collet chuck reception body 17 is connected that receives the collet chuck 31. For captive support of the clamping rotor 37 in the base body 15 a support seat element 30 is screwed in the base body 15 that limits a reception chamber for the clamping rotor 37 toward the collet chuck reception body 17. In doing so, the clamping rotor 37 is enclosed and held in the base body 15 independent from the collet chuck reception body 17. This allows new possibilities for service and adaption of the tool holder 10 to different circumstances and particularly, however, the force flow originating from the clamping rotor 37 during clamping is kept away from the collet chuck reception body 17. This is beneficial for the precision of the tool holder 10.

LIST OF REFERENCE SIGNS 10 tool holder
11 tool
12 machine spindle interface
13 hollow shank taper
14 gripping disk
15 base body
16 central through-hole
17 collet chuck reception body
18 collet chuck reception opening
19 central axis
20 ring
21 ejection channels
22 fluid channels
23 ejection openings
24 tube extension
25 planar surface
26 outer thread of extension 24
28 inner thread of extension 24
29 ring shoulder
30 support seat element
W opening width
31 collet chuck
32 abutment surface
33 face
34 slide ring
35 first planar surface of the slide ring 34
36 second planar surface of the slide ring 34
37 clamping rotor
38 support surface
39 mating surface/cylinder surface
40 wall surface
41 extension
42 O-ring
43 toothing
44 worm
45 hexagon opening
46 rotation device
47 support surface
48 roller body
49 support ring
50 ring shoulder
51 section of the through-hole 16
52 extension of the clamping rotor 37
53 outer surface of the extension 52 of the clamping rotor
54 O-ring
55 clamping pin of the collet chuck 31
56 reception opening of the collet chuck 31

The invention claimed is:

1. A tool holder for clamping of tools for chip removing machining of a workpiece with a rotating tool, comprising:
    a base body provided with a machine spindle interface, a tube extension and a central through-hole, the machine spindle interface at one end of the base body, and the tube extension at an end of the base body that is positioned away from the machine spindle interface,
    a clamping rotor that is arranged in the central through-hole, the clamping rotor being rotatably supported about an axial direction and connected with a rotation device in order to be rotated back and forth and locked in rotation positions, the clamping rotor including a clamping thread that is screwable by a clamping pin of a collet chuck,
    a support seat element inserted into the base body in an axially secured manner and a bearing supported on the support seat element, the bearing axially supporting the clamping rotor, and
    a collet chuck reception body that is attached to the tube extension, the collet chuck having a collet chuck reception opening, wherein the tube extension is provided with an outer thread for connection with the collet chuck reception body.

2. The tool holder according to claim 1, wherein the machine spindle interface is a hollow shank taper.

3. The tool holder according to claim 2, wherein the support seat element is arranged in the tube extension.

4. The tool holder according to claim 3, wherein the support seat element is configured as a ring carrying an outer thread.

5. The tool holder according to claim 4, wherein the ring is arranged in a manner engaging an inner thread provided in the tube extension.

6. The tool holder according to claim 5, wherein the outer thread of the support seat element and the clamping thread are configured as having opposite rotation directions compared with each other.

7. The tool holder according to claim 1, wherein the support seat element is arranged in the tube extension.

8. The tool holder according to claim 1, wherein the support seat element is configured as a ring carrying an outer thread.

9. The tool holder according to claim 8, wherein the ring is arranged in a manner engaging an inner thread provided in the tube extension.

10. The tool holder according to claim 9, wherein the outer thread of the support seat element and the clamping thread are configured as having opposite rotation directions compared with each other.

11. The tool holder according to claim 1, wherein the bearing is a plain bearing.

12. The tool holder according to claim 1, wherein the bearing comprises a slide ring that comprises two planar slide surfaces arranged at sides facing away from each other.

13. The tool holder according to claim 12, wherein the slide surfaces are formed by a wear-reducing coating.

14. The tool holder according to claim 1, wherein the bearing is formed directly at a toothed wheel that is part of the rotation device.

15. The tool holder according to claim 1, wherein a toothed wheel that is part of the rotation device is formed at the clamping rotor and is held between the bearing and an additional axial thrust bearing.

16. The tool holder according to claim 15, wherein the axial thrust bearing is a roller bearing.

17. The tool holder according to claim 1, wherein the clamping rotor is floatingly held in radial direction in the through-hole and is centered by rubber spring elements.

18. The tool holder according to claim 1, wherein the collet chuck reception body comprises a removable ring at an end of the collet chuck reception body facing away from the machine spindle interface and wherein a set of different rings is provided that can be selectively connected with the collet chuck reception body.

19. A tool holder for clamping of tools for chip removing machining of a workpiece with a rotating tool, comprising:
    a base body provided with a machine spindle interface, a tube extension and a central through-hole, the machine spindle interface at one end of the base body, and the tube extension at an end of the base body that is positioned away from the machine spindle interface,
    a clamping rotor that is arranged in the central through-hole, the clamping rotor being rotatably supported about an axial direction and connected with a rotation device in order to be rotated back and forth and locked in rotation positions, the clamping rotor including a clamping thread that is screwable by a clamping pin of a collet chuck,
    a support seat element inserted into the base body in an axially secured manner and a bearing supported on the support seat element, the bearing axially supporting the clamping rotor, wherein the support seat element is configured as a ring carrying an outer thread and the the ring is arranged in a manner engaging an inner thread provided in the tube extension, and
    a collet chuck reception body that is attached to the tube extension, the collet chuck having a collet chuck reception opening.

* * * * *